July 21, 1925.
W. H. BAGLEY
PLUG GAUGE
Filed Nov. 17, 1923
1,547,137
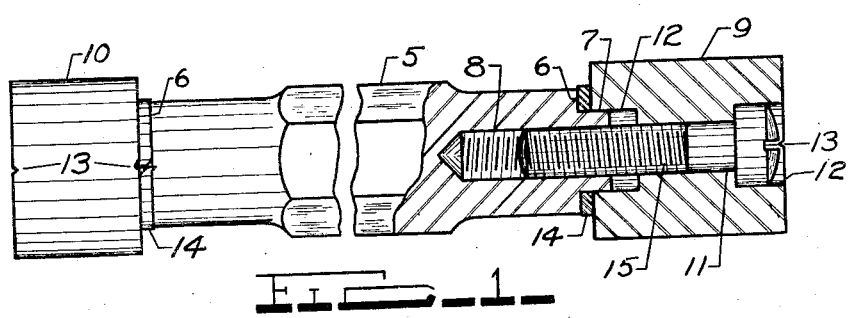
FIG_1_
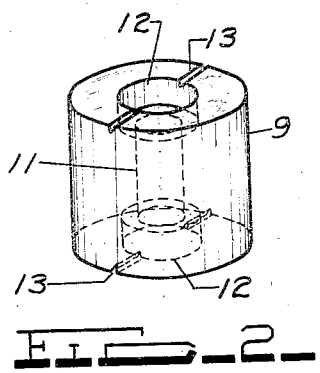
FIG_2_
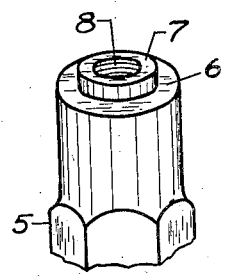
FIG_3_
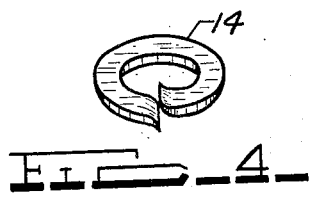
FIG_4_
INVENTOR
WILLIAM H. BAGLEY
BY
P. M. Pomeroy
ATTORNEY Patented July 21, 1925.

1,547,137

UNITED STATES PATENT OFFICE.

WILLIAM H. BAGLEY, OF DETROIT, MICHIGAN, ASSIGNOR TO THE STUDEBAKER CORPORATION, OF SOUTH BEND, INDIANA, A CORPORATION OF NEW JERSEY.

PLUG GAUGE.

Application filed November 17, 1923. Serial No. 675,405.

*To all whom it may concern:*

Be it known that I, WILLIAM H. BAGLEY, a citizen of the United States of America, and resident of Detroit, in the county of Wayne and State of Michigan, have invented certain new and useful Improvements in Plug Gauges, of which the following is a specification.

This invention relates broadly to tools, and more particularly to plug or thread gauges preferably of the "go" and "not go" type adapted for determining accurately predetermined dimensions of circular openings.

One object of this invention is to produce an accurate plug or thread gauge having interchangeable wearing surfaces, and of such construction that one handle may be interchangeable with a plurality of gauge heads.

Another object is to provide simple and improved means for securing the gauging heads to the gauge handle together with improved means for preventing relative rotation of the gauging heads and handle.

A still further object of this invention is to provide a gauge of the type defined comprising few and simple parts of rugged construction not easily distorted, easily machined and economically manufactured.

The above being among the objects of the present invention, the same consists of certain features of construction and combination of parts to be hereinafter described and then claimed with reference to the accompanying drawings which illustrate a suitable embodiment of the present invention having the above and other objects in view.

Referring to the drawings:

Figure 1 is a fragmentary side elevational view of a gauge, certain of the parts being broken away and in section to more clearly show the construction.

Figure 2 is a perspective view of one of the gauge heads.

Figure 3 is a perspective view of one end of the gauge handle.

Figure 4 is a perspective view of one of the lock washers used to prevent the head from turning on the handle.

The use of double ended plug or thread gauges with reversible heads is conventional practice in shops where there is quantity production, for determining accurately predetermined dimensions of circular openings having either cylindrical or threaded walls. The type shown in the drawings is for use in connection with those openings having cylindrical walls, and is for the purpose of illustration only, as it is evident that the cylindrical gauge heads may be replaced by threaded heads without departing from the invention involved.

Such gauges are preferably double ended, that is, they have a gauge head on both ends, one of which is slightly larger in diameter than the other. The conventional practice is to make the diameter of one of the gauge heads the minimum diameter allowed for the hole to be tested, and the other gauge head the maximum diameter allowed for the hole to be tested. Thus the small gauge head must be capable of entering the hole while the large one must not, and any articles having holes therein which must be within the limits of this gauge and those which do not conform to the above requirements are rejected.

As illustrated in Figure 1, it is the conventional practice to make the "go" gauge head of greater length than the "not go" gauge head in order that the user may tell at a glance which has the large diameter and which the small, as the actual difference in diameter is usually so small that it is not discernible without the use of special instruments.

The gauge heads are preferably themselves reversible on the handles for the reason that after one end wears it may be reversed and the other end used, thus lengthening the life of each head. It is also preferable that gauge heads of different diameters be adapted to fit the same handles, in order that the same be interchangeable and the cost reduced.

It is important that the heads thus secured to the handle must not move relative to it, or, in shop parlance, there must be no "shake" of the head on the handle. This rigid connection is necessary because in work of the accurate nature in connection with which these gauges are used, such a "shake" would be apt to lead the user of the gauge to believe that there was a freedom of movement between the gauge head and work when in reality there was not.

The above points have all been carefully considered in the gauge shown in the accompanying drawing, and in the description like numerals refer to like parts throughout the several views. 5 is a handle, each end of which is provided with a shoulder 6 in a plane perpendicular to its axis, (see Figure 3) and a cylindrical boss or projection 7 formed on either end of the handle. An opening 8 at each end of the handle 5 is disposed axially and concentrically in respect to the handle 5 and bosses 7 and is provided with threaded walls. Two gauge heads 9 and 10 are adapted to be secured to the ends of the handle 5. In the drawings the gauge head 9 may be presumed to be the "go" or small diameter gauge head and the gauge head 10 may be presumed to be the "not go" or large diameter gauge head. For the purpose of illustration only the gauge head 9 is shown in perspective in Figure 2, the gauge head 10 being of the same general construction but of less length; therefore a description of one will suffice for both. The gauge head 9 has an axially disposed opening 11, the end portions of which are enlarged to form recesses 12, the diameter of the recesses 12 being such as to accurately fit the boss 7. Grooves 13, the purpose of which will presently be described, extend radially outward from the edge of the recess 12 to the cylindrical surface of the gauge heads in the end surfaces.

In assembling the gauge head on the handle 5, a positive type lock washer 14 is first placed over the boss 7 and against the shoulder 6, the boss 7 being entered into the recess 12, and a screw 15 is inserted through the opening 11 into the threaded opening 8. The lock washers 14 are for the purpose of preventing relative rotation between the heads 9 or 10 and the handle 5. Inasmuch as the heads 9 and 10 are hardened, the lock washers 14 would be unable to grip or enter one of their smooth surfaces, unless special means were provided, and the grooves 13 are formed for this purpose. In pulling the heads 9 or 10 down on the handle 5, one of the free projecting ends of the lock washer 14 which extends substantially perpendicular to the plane of the surface of the washer, is guided into one of the grooves 13 and the screw 15 is tightened down until the remaining free end of the lock washer 14 sinks into the soft metal of the shoulder 6, thus preventing the heads 9 or 10 from turning on the handle 5. When the head is properly pulled down into place the lock washers are flattened out and the axes of the heads 9 and 10 are coincident with the axis of the handle 5. The boss 7 is merely for the purpose of centering the heads on the handle and enters the recesses 12 only far enough to accomplish this result. The head of the screw 15 is of such diameter as to be capable of entering the recess 12 and of such a height that when seated in the bottom of the recess 12 its upper surfaces is within the end surfaces of the heads 9 or 10. This allows the gauges to be placed on end which is a matter of great convenience in handling. The body of the screw does not necessarily have to closely fit the sides of the openings 11 as the fit at this point has nothing to do with the concentricity of the heads 9 and 10 and handle 5. Inasmuch as the boss 7 accurately fits the recess 12, the lock washer 14 prevents relative rotation between the handle and heads and the screw 15 firmly holds the head to the handle and there is no possibility of a "shake" occurring between the head and handle.

The heads 9 and 10, being substantially uniform in shape in respect to their axes and also to a plane perpendicular to their axes through their center, are such as to not be affected by warping. The design as a whole is simple to the extreme, no difficult machining or fits being necessary in its construction, and results in a product desirable and advantageous to use.

What I claim is:—

1. A gauge of the character described comprising a handle provided with a shoulder, a boss projecting perpendicularly from said shoulder, and a threaded opening centrally disposed with respect to said boss, a gauge head provided with a central opening having enlarged ends adapted to accurately fit said boss, a member interposed between said gauge head and said shoulder having oppositely disposed projections adapted to engage both said handle and said gauge head, and means extending through said gauge head and co-operating with said threaded opening to hold said gauge head on said handle.

2. A gauge comprising a handle and a removable head, a stop on said handle, means for centering said head on said handle, a member interposed between said stop and said head, said member having portions engaging said stop and head to prevent relative rotation thereof, and screw means extending through said head into said handle for holding said head on said handle.

3. A gauge comprising a handle and a removable head received thereby, said handle being provided with a shoulder and a boss centrally disposed relative thereto, and a threaded opening centrally disposed relative to said boss, said head being provided with a centrally disposed opening having enlarged end portions adapted to accurately fit said boss, a substantially flat member having oppositely disposed projections extending perpendicular to the plane of its surfaces, said member being positioned around said boss and against said shoulder, and said head being placed on said boss and against said member, and screw means extending through said head for securing the same to said handle.

4. A gauge of the character described comprising a handle provided with a shoulder, a boss extending perpendicularly from said shoulder, and a threaded opening disposed centrally with respect to said boss, a gauge head having a central opening, the ends being enlarged to form recesses to accurately receive said boss and centrally locate said head in respect thereto, a member interposed between said shoulder and said head provided with oppositely extending projections adapted to engage said gauge head and said shoulder to prevent relative rotation therebetween, and means extending through said gauge head and engaging said threaded opening for holding said head to said handle.

5. A gauge comprising a handle of relatively soft metal provided with a shoulder, a boss extending perpendicularly from said shoulder, there being a threaded opening disposed centrally with respect to said boss, a gauge head of relatively hard metal having a central opening adapted to receive said boss and centrally locate said head in respect thereto, a recess formed in the end of said head, a member interposed between said shoulder and said head provided with oppositely extending projections, one of said projections being received in the recess formed in said head and the other of said projections being adapted to engage the shoulder on said handle, and means extending through said gauge head and engaging said threaded opening for holding said head on said handle.

Signed by me at Detroit, Michigan, U. S. A. this 14th day of November, 1923.

WILLIAM H. BAGLEY.

Witnesses:
HODGSON S. PIERCE,
DONALD B. WAITE.